United States Patent [19]

Denton

[11] Patent Number: 4,989,697
[45] Date of Patent: Feb. 5, 1991

[54] COOLING, CLEANING AND DRYING MEANS FOR BRAKE DRUMS AND THE LIKE

[76] Inventor: Lynn E. Denton, 3502 10th Avenue, Council Bluffs, Iowa 51501

[21] Appl. No.: 321,178

[22] Filed: Mar. 9, 1989

Related U.S. Application Data

[63] Continuation-in-part of Ser. No. 14,834, Feb. 13, 1987, Pat. No. 4,830,150, which is a continuation-in-part of Ser. No. 833,541, Feb. 27, 1986, Pat. No. 4,674,606.

[51] Int. Cl.⁵ .......................................... F16D 65/827
[52] U.S. Cl. ............................ 188/264 R; 192/113 A
[58] Field of Search .................. 188/218 R, 264 R; 192/113 A; 416/93 R, DIG. 3; 310/62, 63

[56] References Cited

U.S. PATENT DOCUMENTS

| | | | |
|---|---|---|---|
| 966,169 | 7/1934 | Forbes | 188/264 R |
| 2,432,185 | 12/1947 | Watson | 416/DIG. 3 X |
| 2,626,743 | 1/1953 | Sanders | 416/DIG. 3 X |
| 2,659,459 | 11/1953 | Lyon | 188/264 R |
| 2,896,749 | 7/1959 | Gaylord | 188/264 R |
| 3,127,959 | 4/1964 | Wengrowski | 188/264 R |

FOREIGN PATENT DOCUMENTS

| | | | |
|---|---|---|---|
| 481521 | 8/1929 | Fed. Rep. of Germany | 188/264 R |
| 730453 | 8/1932 | France | 416/DIG. 3 |
| 1226608 | 7/1960 | France | 188/264 R |

*Primary Examiner*—George A. Halvosa
*Attorney, Agent, or Firm*—Mason, Fenwick & Lawrence

[57] ABSTRACT

An elongated strip having spaced-apart air scoops formed thereon is adapted for installation within the brake drum of a truck for creating a flow of air across the braking surfaces of the drum in response to rotation of the drum. The strip is installed against the interior surface of the drum exterior wall adjacent the outer periphery thereof and is secured in place by the drum mounting studs or other threaded fasteners inserted through strip mounting holes in radially inward extensions of the strip upon alignment of those holes with the drum mounting holes. A second embodiment employs a plurality of strip sectors of arcuate configuration connected in end-to-end manner with a back sheet cooperating to define an air compression/flow cavity between it and the interior of each air scoop.

5 Claims, 4 Drawing Sheets

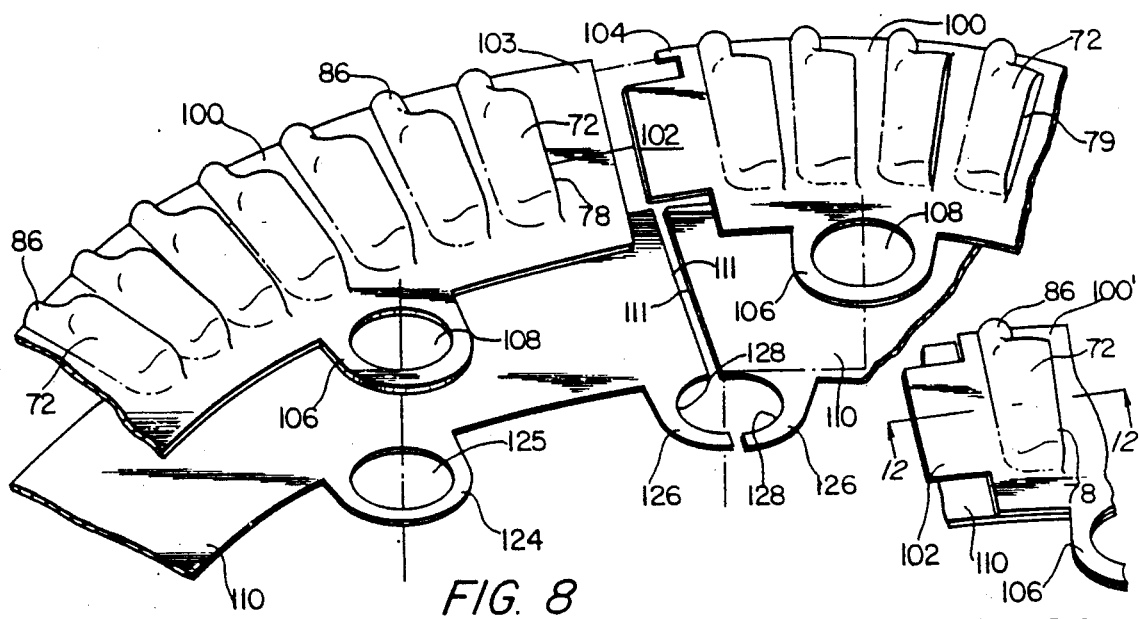
FIG. 8
FIG. 8A
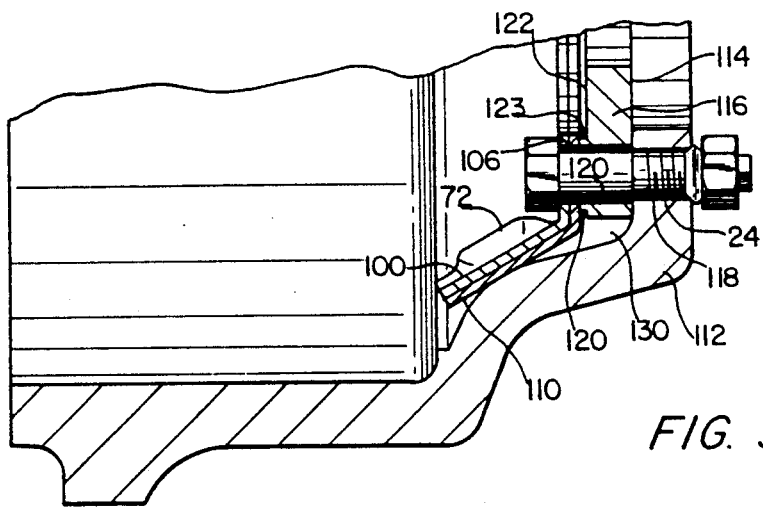
FIG. 9
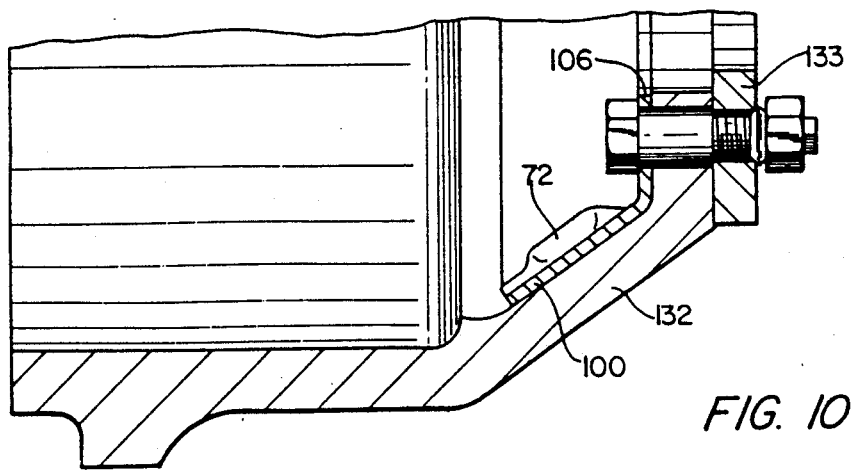
FIG. 10

COOLING, CLEANING AND DRYING MEANS FOR BRAKE DRUMS AND THE LIKE

CROSS-REFERENCE TO RELATED APPLICATIONS

This application is a continuation-in-part of earlier application Ser. No. 014,834 filed Feb. 13, 1987 U.S. Pat. No. 4,830,150, which is a continuation-in-part of application Ser. No. 833,541 filed Feb. 27, 1986, now U.S. Pat. No. 4,674,606.

BACKGROUND OF THE INVENTION

The present invention is directed generally to means arranged within a brake drum or similar item for automatically cooling, drying and cleaning the drum in response to rotation of the drum. The invention is particularly directed to apparatus for cleaning the brake drums of heavy-duty trucks during operation of the trucks.

Approximately eighty percent of accidents involving 18-wheel tractor-trailer trucks are caused by wet brakes. To dry their brakes, truckers can power brake (drive with the left foot on the brake pedal so as to create friction and heat); however, this results in significant wear of the brake shoes and drums.

When brakes are used for lengthly time periods, powder coming off the brake lining stays between the brake shoes and the drum while the brakes are applied. Upon release of the brakes, the powder flies around the interior of the drum by centrifugal force and when the brakes are reapplied, the shoes hit the powder which then in effect becomes a grinding compound creating heat and early brake failure. The addition of rain or snow exaggerates the problem by reducing brake effectiveness even further. Consequently, the need for clean brakes has long been recognized as a major problem and has never been fully solved. Custom brake drums have been proposed including means for directing air exteriorly into the space between the wheel and brake drum but such devices are positioned radially away from the braking surfaces and their operation frequently resulted in moisture being fed into the interior of the drum along with the air intended to dry the drum. Mechanical shields have been proposed to keep the brakes dry; however, they cut off air circulation and make the brakes and wheel bearing run much hotter.

A more successful solution to these problems was proposed by this inventor and is disclosed in U.S. Pat. No. 4,621,715 which discloses an elongated flexible strip adapted to be wrapped around the peripheral wall of a brake drum adjacent the free interior edge thereof. A row of fins formed on the strip extends radially inwardly therefrom at a position adjacent to and interiorly of the interior edge of the brake drum to create suction and effect a rush of air interiorly away from the brake drum both to dissipate moisture and foreign objects on the braking surface at every r.p.m. as well as to prevent the entry of moisture from the ambient atmosphere. Whereas that invention has operated successfully, its exposed position renders it susceptible to damage. It was subsequently discovered that other structures mounted internally of the drum in a protected location could more effectively accomplish substantially the same result by blowing air interiorly across the interior surface of a brake drum rather the sucking air thereacross as in the aforementioned patent.

The last-mentioned advancements, proposed by this inventor and disclosed in applicant's pending application Ser. No. 014,834 provides a circular elongated flexible strip adapted for securement within the brake drum with a plurality of scoops or fins on the strip operating to create a rush of dry, cooling, cleansing air across the braking surface in response to rotation of the drum. Whereas the inventions of Pat. No. 4,674,606 and said pending application have likewise operated successfully in most installations, some installations involving outboard mounted drums have a relatively large air space between the elongated flexible strip and the facing surface of the drum into which the air flow from the scoops or fins is directed. The air can easily escape from such air spaces so as to reduce the velocity and pressure of the air available for cooling and/or cleaning the drum.

A basic object of the invention is the provision of new and improved air or gas blowing means.

A further object of the invention is to provide improved means for cooling, drying and cleaning the brake drums of heavy-duty trucks.

Another object of the invention is to provide such an apparatus for brake drums which is adjacent the radial wall of the drum and positioned so as not to interfere with inspection of, or access to, the brakes of a truck.

Another object of the invention is to provide such an apparatus readily suited for use with single or multiple axle vehicles and trailers.

Another object of the invention is to provide strip means having cooling, drying and cleaning fins formed thereon, which strip may be readily installed internally of both inboard mount and outboard mount conventional brake drums of various sizes without modification of the drum itself.

Yet another object of the present invention is the provision of brake cooling and cleaning means for outboard mount drums in which the airflow is maintained in relatively small conduits and chambers to minimize the reduction in pressure and velocity available for cleaning and cooling the drum.

A still further object of the invention is the provision of cooling means that can be mounted on two different drums having different numbers of mounting holes for attachment to an associated hub.

Finally, an additional object is to provide brake drum cooling and cleaning apparatus which apparatus is economical to manufacture, easy to install and efficient in operation.

SUMMARY OF THE INVENTION

The present invention is directed to an improved circular air scoop providing strip means supporting cooling air scoops or fins adapted for installation within the brake drum of a heavy-duty truck or the like for creating a flow of cooling, drying and cleansing air across the braking surface of the drum in response to rotation of the drum. The strip means is formed for installation against the interior surface of the brake drum radial wall adjacent the outer periphery thereof. No tapping of holes or other modification of the drum is normally required to secure the finned strip in place since the strip includes a plurality of radially inwardly extending tabs each having a hole adapted for alignment with a mounting hole of the drum. Accordingly, the strip means is positively secured within the drum by the same threaded fasteners which mount the drum on the hub.

In a second embodiment, the finned strip means comprises a plurality of flexible arcuate strip sectors having male/female ends which are connected in end-to-end manner to provide a complete circular finned strip means. Similar arcuate sheets define a planar backwall plate which is clamped between the rear surface of the finned strip and the drum to cooperate with the air scoops on the strip to define an air flow chamber of small volume. The backwall is necessary for satisfactory operation when the system is used with an outboard mount drum in which the geometry of the drum results in a large open space between the drum and the rear surface of the air scoop strip through which the air flow would go if it were not for the presence of the backwall.

A third embodiment is useful for permitting use of the invention in two different drums having different numbers of bolt holes such as for example for connection to either drums having ten bolt holes or drums having five bolt holes. In such case the strip has ten mounting holes (two on each of five arcuate sectors) with each hole receiving a threaded connector bolt for connecting on a ten hole drum to a ten hole hub; however, the same strip can be used on a five hole drum by the use of five arcuate clamp plates for clamping the strip sectors in position to block the five unused mounting holes. Similarly, another strip is usable in the same manner with drums having either eight holes or four holes.

Since truck weights and lengths have been greatly increased in recent years while still using the same brakes employed on smaller trucks, the present invention is critically needed both for safety purposes and for cost reduction by lengthening the life of brake components.

BRIEF DESCRIPTION OF THE DRAWINGS

FIG. 8 is a perspective view of a second aspect of the invention which is of particular usage with certain outboard mount brake drums;

FIG. 8A is a perspective view of a variation of the embodiment of FIG. 8;

FIG. 9 is a sectional view through an outboard mount brake drum and associated hub illustrating an installation of the embodiments of either of FIGS. 8 or 8A;

FIG. 10 is a sectional view of the air scoop strip means of either FIG. 8 or FIG. 8A installed in an inboard mount brake drum;

DETAILED DESCRIPTION OF THE PREFERRED EMBODIMENTS

Figure 1:
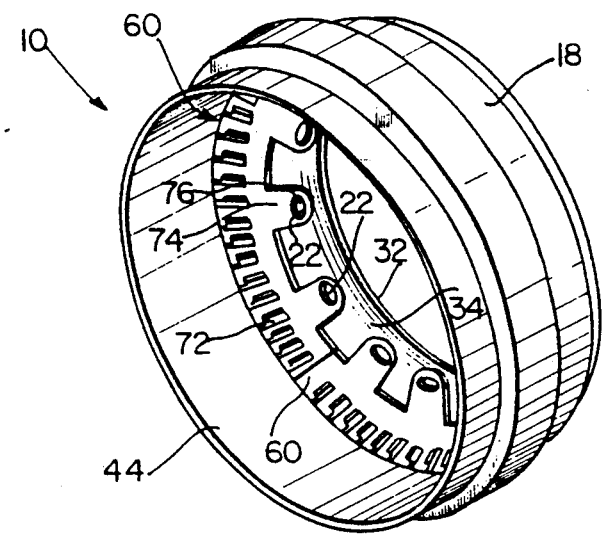
FIG. 1 is a perspective view of a brake drum in which a first embodiment of the invention is mounted.
Figure 6:
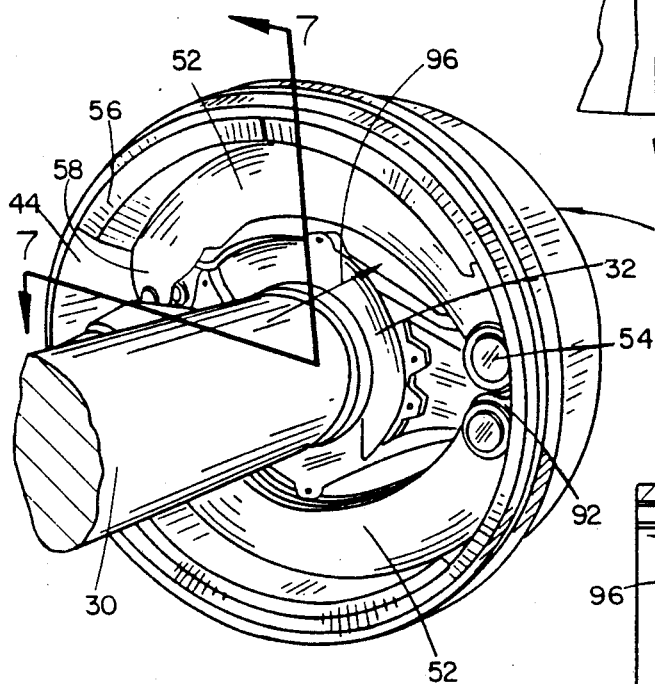
FIG. 6 is a perspective view of an inboard mount brake drum using the embodiment of FIGS. 1, 4, 5 etc. installed on a vehicle axle assembly.
Figure 7:
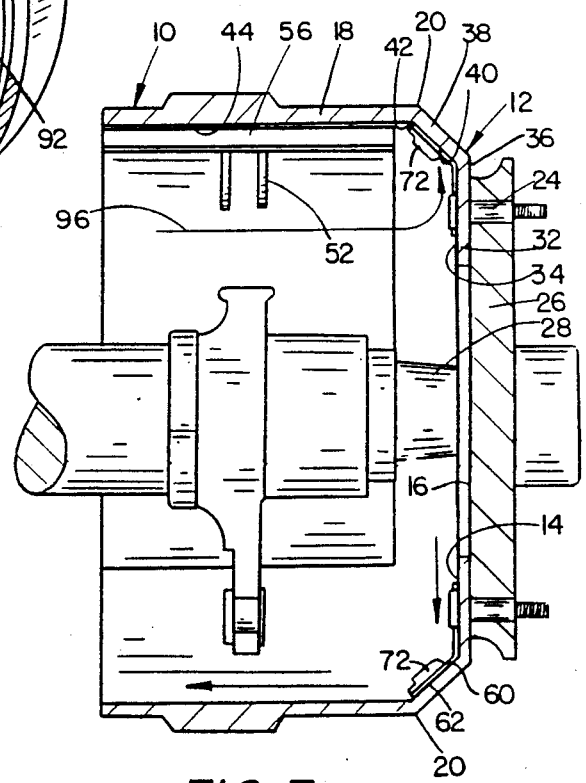
FIG. 7 is a sectional view taken along line 7—7 of FIG. 6 illustrating the first embodiment of the invention installed therein.

FIGS. 1, 6 and 7 show a conventional truck brake drum 10 including a generally upright exterior radial wall 12 having interior and exterior surfaces 14 and 16 respectively and a generally cylindrical wall 18 extending inwardly from the outer periphery 20 of the exterior wall 12. The exterior wall 12 has a plurality of drum mounting holes 22 through which studs or bolts or other threaded fasteners 24 are extended for mounting the brake drum on a wheel supporting hub 26. The number of drum mounting holes 22 will vary for the equipment of different manufacturers with the most common hubs and drums having either ten, eight, five or four openings 22. The hub is rotatably mounted on axle 28 which protrudes exteriorly from the stationary axle sleeve 30 on which the brake assembly 32 is mounted. The mounting arrangement shown in FIG. 7 is what is usually referred to as an inboard mount in that the drum is attached to the inboard side 16 of the hub.

The exterior wall 12 of the drum includes a radially extending generally planar radial inner portion 33 having interior and exterior surfaces 34 and 36, and a frustoconical shaped outer portion 38 inclined inwardly (to the left in FIG. 7) from the inner portion 32 and having an interior surface 40 which terminates in an outer annular edge 42 defining the junction between exterior wall 12 and cylindrical wall 18.

The inner surface of cylindrical wall 18 comprises a brake surface which is a first machined surface 44. Surface 44 is the surface engaged by the brake shoes for stopping the vehicle. The drum has a second machined surface on the interior surface 34 of the inner portion 32 of exterior wall 12. A third machined surface is presented on the exterior surface 36 of the inner portion 32 of exterior wall 12. The machined surfaces are machined so as to be precisely positioned relative to one another to ensure that the drum is concentrically disposed with the hub and axle onto which it is mounted.

As shown in FIGS. 6 and 7, the brake assembly includes a pair of shoes 52 each having ends 54 which are pivotally mounted and which carry the brake linings 56. Upon actuation of the brakes, the opposite ends 58 of the shoes are forced apart urging the linings against the first machined surface 44 of the brake drum to stop the vehicle. Substantial heat is generated by the braking operation and such heat is partially dissipated by the various embodiments of the present invention.

Figure 2:
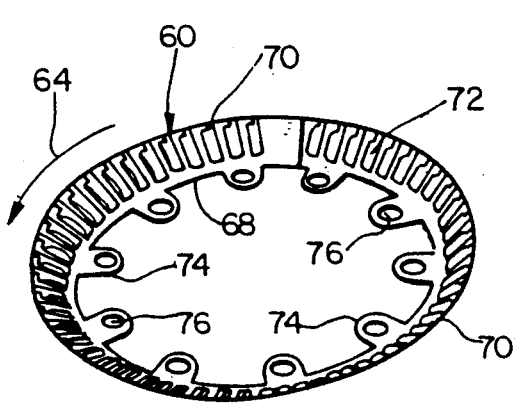
FIG. 2 is a perspective view of an air scoop strip of FIG. 1 embodiment adapted for installation on the drums on the left side of a vehicle.
Figure 4:
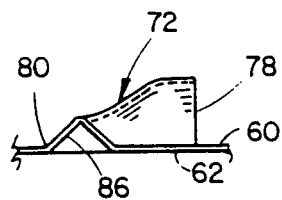
FIG. 4 is an enlarged radial end view of one of the air scoop fins as viewed looking inwardly in the direction opposite arrow 88 in FIG. 5.

The first embodiment of the invention employs a generally circular elongated flexible air scoop strip 60 having outwardly protruding air scoops 72 installed within the brake drum 10 as shown in FIG. 1. FIG. 2 shows the strip 60 with the opposite ends drawn together in overlapping relation to illustrate the frustoconical shape assumed by the strip as a consequence mounting in the drum so that the exterior surface 62 (FIGS. 4 and 7) of the strip corresponds to the interior surface 40 of the drum frustoconical outer portion 38. Prior to mounting, the strip is of planar configuration with all parts, other than scoops 72, including tabs 74 lying in a common plane.

Figure 5:
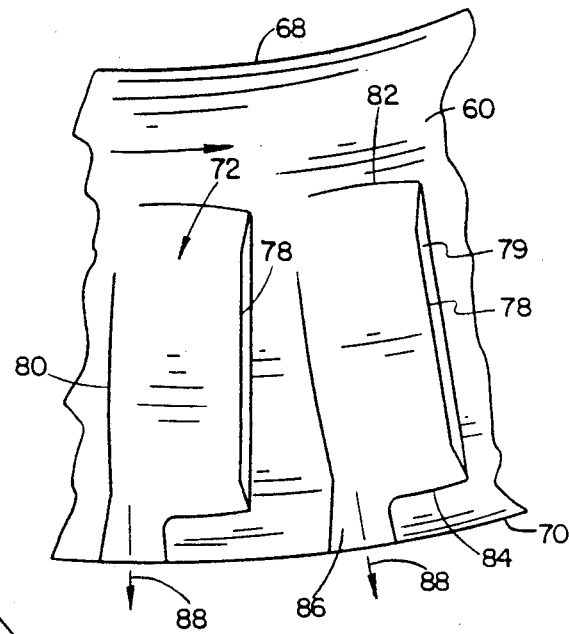
FIG. 5 is an enlarged top plan view of a portion of the air scoop strip and two air scoops thereon looking in a direction perpendicular to the surface of the strip.

Strip 60 has radially spaced apart inner and outer edges 68 and 70. A plurality of fins or air scoops 72 are formed unitarily with the strip 60. A preferred shape for the fins or air scoops 72 is illustrated in FIGS. 4, 5, 8 and 12. Each air scoop 72 includes a protruding projection having an open leading side 78 (FIG. 12) defining an open mouth or air inflow inlet 79 facing the direction of movement of air scoops 72. The trailing side 80 of the air scoop unitarily merges into the strip 60 and the air scoop has inner and outer ends 82 and 84 as shown in FIG. 5. Thus, each air scoop 72 forms an air chamber 81 bounded by mouth 79 on leading side 78, ends 82 and 84, trailing side 80 and either a portion of interior surface 40 of the drum or of a backwall plate 110 described in the following description of FIGS. 8 and 9. A raised discharge passageway 86 of substantially less transverse flow area than mouth 79 extends radially outward from the air chamber 81 formed by air scoop 72.

Rotation of drum 10, strip 60 and air scoops 72 causes the air scoops 72 to trap air and compress it in chamber 81 due to the pressure velocity (ram pressure) resultant from the movement of the air scoops through the air. The compressed air is then directed outwardly in the direction of arrow 88 in FIG. 5 through the discharge passageway 86 to flow in the manner illustrated by arrow 89 in FIG. 7 across the first machined surface 44 of the drum 10. Centrifugal force also aids in the ejection of the air radially through the air discharge passageway 86.

To secure the strip 60 to the drum 10, each strip includes a plurality of tabs 74 protruding radially inwardly from the inner edge 68 of the strip 60. The tabs are of a size and position to overlie the drum mounting holes 22 an each tab 74 includes a strip mounting hole 76 which is alignable with the corresponding drum mounting hole for receiving the same threaded fastener 24 used for securing the drum 10 to the hub 26. During installation as in FIG. 7 the tabs 74 become inclined relative to the strip 60 so as to remain in a common plane when the remainder of the strip takes on its installed frusto-conical shape.

Whereas the tabs 74 will normally secure the opposite ends of the strip 60 in the desired overlapped relation when the strip is installed in a drum 10, in some installations separate fasteners such as rivets or the like may additionally be used for maintaining the ends of the strips in such overlapping relation at all times.

In operation, referring to FIG. 6, some of the air which is directed outwardly through discharge passageway 86 from the fins 72 impinges upon the brake shoes 52 and linings 56. However, there is an air space 92 between the adjacent ends 54 of the brake shoes and another air space between the opposite ends 58 of the brake shoes which permit air flow. There is also a small gap between the linings 56 and drum when the brakes are not being applied. The air flow caused by the air scoops creates a suction which draws air into the brake drum between the shoes 52 and axle sleeve 30, as indicated by arrows 96 in FIGS. 6 and 7. Thus, the constant air flow across the brake surfaces 44 when the truck is moving dissipates heat and moisture and cleans the drum of any dust buildup.

Figure 3:
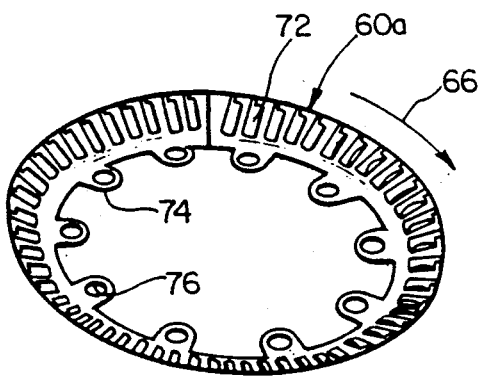
FIG. 3 is a perspective view of an air scoop strip of the FIG. 1 embodiment adapted for installation on the drums on the right side of a vehicle.

Whereas strip 60 of FIG. 2 is shown for illustration on a wheel on the left side of a vehicle for rotation in the direction of arrow 64, FIG. 3 shows a strip 60a having air scoops 72a which is a mirror image of strip 60 (i.e. air scoops 72a face in an opposite direction from air scoops 72) for installation on a drum on the right side of the vehicle for rotation in the direction of arrow 66. Thus, the following description will be directed to the strip 60 with the understanding that it applies equally to strip 60a.

FIG. 8 illustrates another embodiment which is quite similar to the embodiment of FIGS. 1, 2 etc. but differs in a first manner in that the circular strip is in the form of an assembly of five identical flexible arcuate strip sectors 100 which are connected together in an end-to-end manner to form the complete circular strip. FIG. 8 only illustrates portions of two of the arcuate strip sectors which is all that is required to understand the circular assembly since all of the sectors are connected to each other in the manner shown in FIG. 8. Such end-to-end connection is effected by a male connector tab 102 on one end of each flexible strip sector which is received connected to the female end 103 of the next adjacent flexible strip sector 100. More specifically, male tab 102 is inserted in mouth 79 of the air scoop 72 adjacent the end of the next adjacent strip. Additionally, a small tab 104 is optionally provided near the outer periphery of each flexible strip sector as shown in FIG. 8. However, the small tab 104 is not essential in some installations and can be omitted as shown on strip 100' in FIG. 8A.

Additionally, the embodiment of FIG. 8, 8A, 10 and 10A differs from the FIG. 1 embodiment in employing shorter tab members 106 which extend radially a smaller distance than do the tab members 74 of the first embodiment. Such shorter tab members can also be used with the embodiment of FIGS. 1 etc. if required by the dimensions of a particular drum. The shorter tab members 106 include strip mounting holes 108 and are identical to the tabs 74 and holes 76 in all respects other than their radial spacing from the main body of the strip. Air scoops 72 that are precisely identical to the air scoops of the first embodiment are also provided on the strips 100 and similar strip 100'.

The embodiment illustrated in FIGS. 8, 8A and 10 also includes five backwall walls or plates 110 having ends 111 mounted and which are mounted in end-to-end relationship between the flexible strip sectors 100 and the drum 112 (FIG. 9) with which the assembly is associated.

The drum mounting assembly in FIG. 9 is an outboard mount in that the drum 112 engages the outer surface 114 of a hub 116 and is held in connection thereon by threaded connectors 24 extending through openings 118 in the drum and 120 in the hub 116. It should be noted that hub 116 includes an inner surface 122 which has a cylindrical projection lug, or boss 123 extending inwardly and surrounding the opening 120 for strengthening purposes. It should be observed that each backwall plate 110 includes a centrally positioned mounting tab 124 mounted midway between its ends and having a strip mounting hole 125 alignable with the hole 108 of the tab 106 of the flexible strip sector 100. Additionally, each end of each backwall plate 110 includes a semi-tab member 126 including a semi-circular end surface 128. The ends 111 of each backwall plate 110 abut the next adjacent backwall plate as shown in FIG. 8 and the two facing semi-circular surfaces 128 cooperate to define a strip mounting hole identical in dimensions to that of strip mounting hole 125. For a typical installation, five flexible strip sectors 100 and five backwall plates 110 would be assembled as shown in FIG. 8 and mounted in a ten mounting hole drum 112 as shown in FIG. 9. It should be observed that the particular mounting results in a large air space 130 outwardly of the backwall plates 110 and that if it were not for the presence of the backwall plates 110, air would be directed inwardly by air scoops 72 into the space 130 and would be dissipated in a random manner through slots between the outer surface of strip 100 and the inner surface 122 o the hub 116. Such slots are due to the fact that the cylindrical lug, boss or protrusion 123 would space the flexible strip sectors 100 a discreet distance away from the inner surface 122 of the hub so as to provide for a series of arcuate slots through which the air could escape. However, the presence of the backwall plate 110 precludes such escape and channels the air to flow from the air chamber inside each air scoop 72 outwardly through the air discharge passageway 86 in a manner that will be apparent from inspection of FIG. 12 which shows such a backwall plate associated with the slightly modified strip 100'; however, the association of the backwall plate 110 with strip 100 is in precisely the exact same manner as it is with the flexible strip sectors 100' of FIG. 12. It is clear that the operation of the backwall plate serves to cause all of the air flow to be discharged outwardly through opening 86 in the desired manner, a flow that would not occur if it were not for the presence of the backwall plate in this particular type of installation.

Figure 2A:
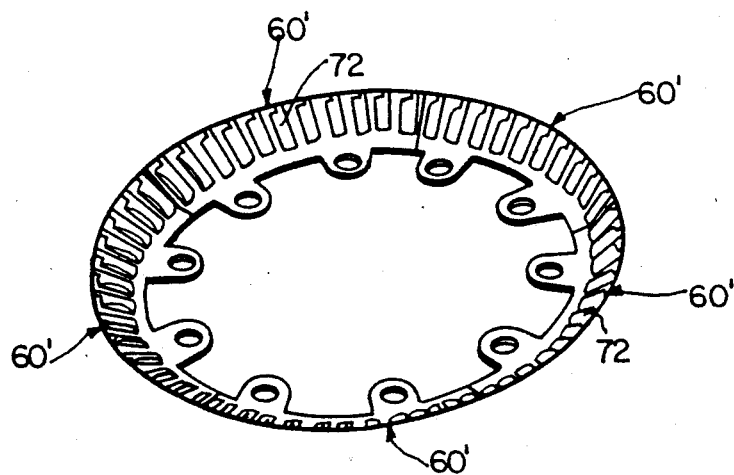
FIG. 2A is a perspective view of an alternative air scoop strip identical to that of FIG. 2 but formed of five end-to-end connected arcuate air scoop strip sectors.

FIG. 10 illustrates the mounting of sectors on an inboard mount drum 132 mounted on a hub 133 not requiring the use of backwall plates. Similarly, FIG. 2a illustrates how ring 60 could be divided into five equal arcuate sectors 60' if desired so as to function in the same manner as arcuate sectors 100.

Figure 11:
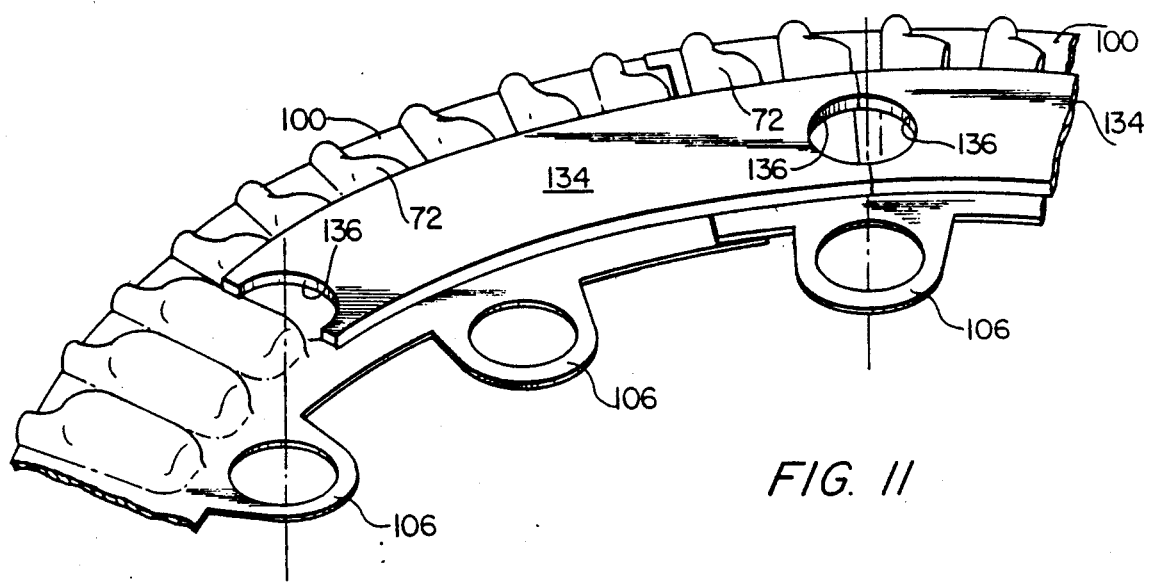
FIG. 11 is an exploded perspective view of a fourth aspect of the invention showing the manner in which a strip having ten mounting bolt receiving openings can be mounted on a hub having only five mounting bolt receiving openings.
Figure 12:
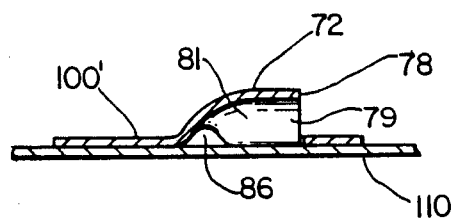
FIG. 12 is a sectional view taken along line 12—12 of FIG. 8A.
Figure 13:
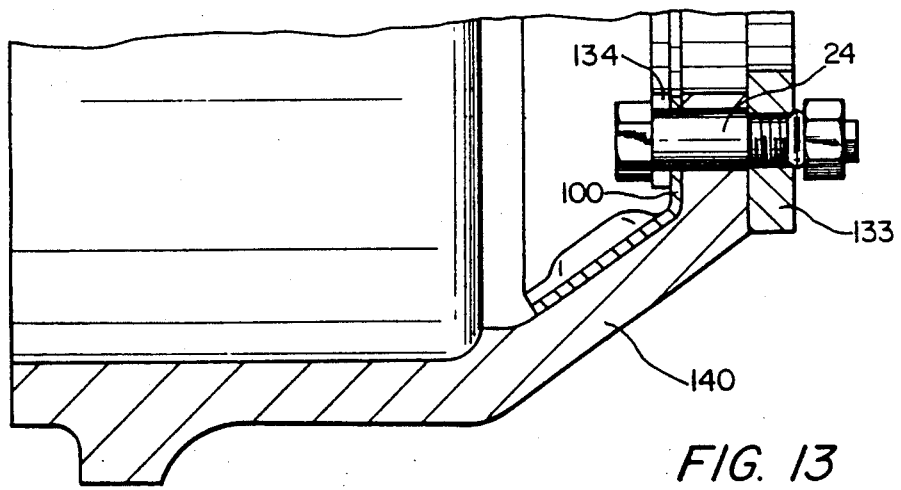
FIG. 13 is a sectional view similar to FIG. 10 but illustrating an installation of the embodiment of FIG. 11.

FIG. 11 illustrates a further manner of using the flexible strip sectors 100 of FIG. 8 with a drum having five mounting openings instead of ten. In such an installation, only half of the tabs 124 would be alignable with a hub opening and the clamping of the strips 100 to the hub would not be as effective as would be the case if all of the tabs were used for the mounting of the strip members. Therefore, this aspect of the invention employs five arcuate clamp plates 134 each having semi-circular surfaces 136 at each end. The ends of the clamp plates 134 abut as shown in FIG. 11 and the two semi-circular surfaces 136 cooperate to define an opening of the same size a the opening 108 and the tabs 106 with which they are aligned. In such an installation, the middle tab 106 would not receive a threaded fastener 124 but would instead be clamped to the surface of the drum by the left hand clamp plate 134 of FIG. 11. The right tab 106 would be clamped by the facing ends of the two clamp plates. Thus, the same flexible strip sectors 100 would be usable with a drum having either ten mounting openings or a drum having only five mounting openings. Five flexible strip sectors 100 and five clamp plates 134 would be employed. For drums having either eight or four drum mounting holes, only four identical sectors each having two tabs would be required. Moreover, the clamp plates 134 could also be used in connection with an assembly employing backwall plates 110 if required. FIG. 13 illustrates the manner in which the clamp plates 134 are associated with the rest of the assembly in a mounting in a drum 140 similar or identical to the drum 132 of FIG. 10.

Whereas the invention has been shown and described i connection with preferred embodiments, it should be understood that many additions, modifications and substitutions may be made which are within the scope of the appended claims. For example the usefulness of the air moving means 72 etc. is not limited to brake drum environments and it would be useful in a wide variety of environments such as jet engine exhausts, transmissions and the like.

Therefore, the spirit and scope of the invention is limited solely by the following claims.

I claim:

1. An apparatus for drying, cooling and cleaning a brake drum mounted for rotation in a given direction and being of the type having a generally upright annular wall with interior and exterior surfaces and a generally cylindrical wall extending inwardly from the outer periphery of the upright wall, said upright wall having a frustoconical shaped outer portion unitarily connected to the generally cylindrical wall and a plurality of drum mounting holes arranged in spaced relation radially inwardly from said frustoconical shaped outer portion and in circumferentially spaced relation thereon for securing said drum to a hub by threaded fasteners, said apparatus comprising:

(a) a generally circular elongated flexible strip means formed of a plurality of arcuate strip sectors connected in end-to-end manner and each having radially spaced apart inner and outer edges, and being formable into a frustoconical shape adapted for engagement against a matching surface of said frustoconical shaped outer portion of said upright wall;

(b) securement means for securing said arcuate strip sectors on the interior of said drum in engagement with the surface of said frustoconical shaped outer portion of said upright wall adjacent said cylindrical wall for lengthwise rotation with the drum:

(c) said arcuate strip sectors including a plurality of air scoops arranged in circumferentially spaced relation thereon and so shaped and positioned to extend substantially across said frustoconical shaped outer portion upon securement of said arcuate strip sectors thereon for causing air flow generally outwardly from said air scoop toward said cylindrical wall in response to rotation of the brake drum in one direction;

(d) said securement means including a plurality of tabs protruding radially inwardly from said inner edge of said arcuate strip sectors;

(e) said tabs being inclined relative to said flexible arcuate strip sectors so as to lie in a common plane upon securement of said arcuate strip sectors in engagement with said frustoconical shaped outer portion; and (f) said tabs being of a size and position to overlie said drum mounting holes and said tabs each including a strip mounting hole alignable with a respective drum mounting hole for securement of the flexible arcuate strip sectors to the drum by the same threaded fasteners employed for mounting the drum on a hub.

2. The apparatus of claim 1 wherein each air scoop comprises a protrusion from its respective strip sector having an open leading side forming a mouth facing the direction of rotation of the drum for collecting air and a inner chamber for receiving and compressing the collected air and a discharge passageway communicating with said inner chamber for exhausting collected air in a direction generally toward the cylindrical wall of the drum in response to rotation of the strip in said one direction.

3. The apparatus of claim 2 wherein said air scoops extend transversely of said strip perpendicular to their direction of rotation.

4. An apparatus for creating a cooling and cleaning airflow through a cylindrical brake drum having a generally radial end wall and a cylinder having an inner surface extending perpendicularly therefrom, said apparatus comprising:
 (a) a generally circular metal air scoop support strip means attachable by threaded connectors to drum mounting holes in said generally radial wall so as to be rotatable therewith about the axis of said cylinder;
 (b) backwall plate means positioned between said metal air scoop support strip and said generally radial wall;
 (c) a plurality of air scoops protruding outwardly of said air scoop support strip surface and each having an inner scoop surface partially cooperating with a surface of said backwall plate means for defining an air receiving chamber having an air gathering mouth oriented transversely to the direction of movement during rotation of the air scoop support strip means for entrapping air as a consequence of rotation of said air scoop support strip means so that such entrapped air flows into said receiving chamber and is compressed by ran effect; and
 (d) air discharge means defining an air discharge opening having an inner end communicating with said air receiving chamber for receiving compressed air from said chamber and discharging such compressed air in a direction toward said inner surface for cooling and cleaning said inner surface;
wherein said generally circular air scoop support strip means comprises a plurality of arcuate strip sectors connected in end-to-end manner;
wherein each of said air scoop arcuate strip sectors includes at least two mounting tabs each having a strip mounting hole for receiving a connector for connecting the arcuate strip sectors to said end wall; and
wherein said backwall plate means comprises a plurality of end-to-end connected arcuate backwall sectors each having a radial extent equal to the radial extent of each of said arcuate strip sectors and outer radial ends each defining a semicircular surface facing a similar semicircular surface of the next adjacent arcuate backwall sector to define a complete circular mounting hole alignable with the strip mounting hole of one of the tabs of a facing arcuate strip sector and a central mounting tab extending from a central portion of each of said backwall plates having a mounting hole alignable with another strip mounting hole of said facing arcuate strip sector so that the ends of said arcuate backwall plates are adjacent the center of an arcuate strip sector when assembled and mounted in such a brake drum.

5. Air flow causing means for effecting the flow of cooling air across the cylindrical brake surface of a brake drum having a radial end wall in which a plurality of mounting holes for attaching the drum to a hub by threaded connectors are provided, said air flow causing means comprising:
 (a) a generally circular air scoop support plate means;
 (b) mounting permitting means on said air scoop support plate means defining mounting openings alignable with said mounting holes of such a drum for permitting said generally circular air scoop support plate means to be attached to said radial wall by such threaded connectors concentrically with respect to the axis of said cylindrical brake surface;
 (c) plural air scoops extending outwardly from said circular air scoop support plate means and each having a mouth-like opening generally oriented on a radius of said circular air scoop support plate means with each mouth-like opening facing the direction of rotation of said generally circular air scoop support plate when attached to said brake drum and during forward movement of a vehicle on which the drum is used;
 (d) an air receiving chamber defined within each of said air scoops for receiving air from each of said mouth-like openings and compressing same by ram effect upon rotation of the circular air scoop support plate in said direction of rotation; and
 (e) an air discharge opening for receiving compressed air from each of said chamber during such rotation of the circular air scoop for providing an air flow toward and across said braking surface;
wherein said generally circular air scoop support plate means is formed of a plurality of arcuate plate sectors connected in end-to-end manner;
wherein said mounting permitting means comprises two tab means on each of said arcuate plate sectors with one mounting opening being provided in each tab means; and
additionally including a plurality of arcuate clamp plate means positionable in concentric circular array over said arcuate plate sectors, each arcuate clamp plate means being of the same arcuate extent as said arcuate plate sectors and having radial end surfaces with a semi-circular recess in each radial end surface, said arcuate clamp plate means being alignable in end-to-end manner so that the semi-circular recesses in adjacent radial end surfaces face each other and cooperate to define a circular recess aligned with alternate one of said mounting openings in said air scoop support plate means to permit the use of only said alternate openings for mounting the arcuate plate sectors on a brake drum having a number of mounting holes equal to half the number of mounting openings in said arcuate plate sectors with said arcuate clamp plate means clamping the arcuate plate sectors in position.

* * * * *